United States Patent
Bell

(10) Patent No.: US 7,210,721 B1
(45) Date of Patent: May 1, 2007

(54) SIDE MOUNTED LADDER RACK FOR PICK-UP TRUCK

(76) Inventor: William Clinton Bell, 315 Queen Anne Way SE, Calgary, Alberta (CA) T2J 4R7

( * ) Notice: Subject to any disclaimer, the term of this patent is extended or adjusted under 35 U.S.C. 154(b) by 0 days.

(21) Appl. No.: 11/329,932

(22) Filed: Jan. 12, 2006

(51) Int. Cl.
  *B60P 3/00* (2006.01)
(52) U.S. Cl. .......................... 296/3; 224/405; 224/310
(58) Field of Classification Search ................ 296/3; 224/405, 310; 414/462
  See application file for complete search history.

(56) References Cited

U.S. PATENT DOCUMENTS

| | | | | |
|---|---|---|---|---|
| 1,991,900 | A * | 2/1935 | Larsen ........................ 224/546 |
| 2,080,527 | A * | 5/1937 | Bixel .......................... 224/405 |
| 3,013,681 | A * | 12/1961 | Garnett ........................... 280/4 |
| 4,954,030 | A * | 9/1990 | Szucs et al. .................. 224/405 |
| 5,297,912 | A * | 3/1994 | Levi ............................ 414/462 |
| 5,398,778 | A * | 3/1995 | Sexton ........................ 224/310 |
| 5,584,521 | A * | 12/1996 | Hathaway et al. .............. 296/3 |
| 5,651,484 | A * | 7/1997 | Fugman ........................ 224/405 |
| 5,662,254 | A * | 9/1997 | Lemajeur et al. ............... 296/3 |
| 5,752,734 | A * | 5/1998 | Ward et al. .................... 296/3 |
| 6,073,781 | A * | 6/2000 | Puglisi ........................ 211/70.6 |
| 6,179,543 | B1 * | 1/2001 | Adame et al. ............... 224/310 |
| 6,360,930 | B1 * | 3/2002 | Flickenger .................... 224/310 |
| 6,827,541 | B1 * | 12/2004 | Ziaylek et al. .............. 414/462 |
| 7,104,429 | B1 * | 9/2006 | Flores ........................... 296/3 |
| 2006/0283663 | A1 * | 12/2006 | Fenner ........................ 182/127 |

* cited by examiner

*Primary Examiner*—Kiran B. Patel
(74) *Attorney, Agent, or Firm*—G. F. Gallinger

(57) ABSTRACT

A ladder rack to carry a ladder on a pick-up truck having a front and rear rack mounting openings in a top portion of the side wall of the bed box, comprising: a front and a rear ladder support each having, i) an upright insertion portion sized to be closely received within one of the mounting openings in the pick-up truck; ii) a lateral offset portion carried by, and extending inwardly from a top portion of the upright insertion portion; iii) a mast portion carried by an inner end portion of the lateral offset portion; iv) a lateral ladder carrying portion extending outwardly and upwardly from an upper portion of the mast, so that a ladder resting thereon will slide inwardly thereon to and against the mast; and, v) a ladder retention means extending outwardly over the ladder from a top portion of the mast to prevent the ladder from bouncing off the lateral ladder carrying portion. In use after the front and rear brackets are inserted within the rack openings, opposite ends of the ladder may be slid over the lateral ladder carrying portions of the supports thereby supporting the ladder parallel to and above the side wall of the bed box.

10 Claims, 1 Drawing Sheet

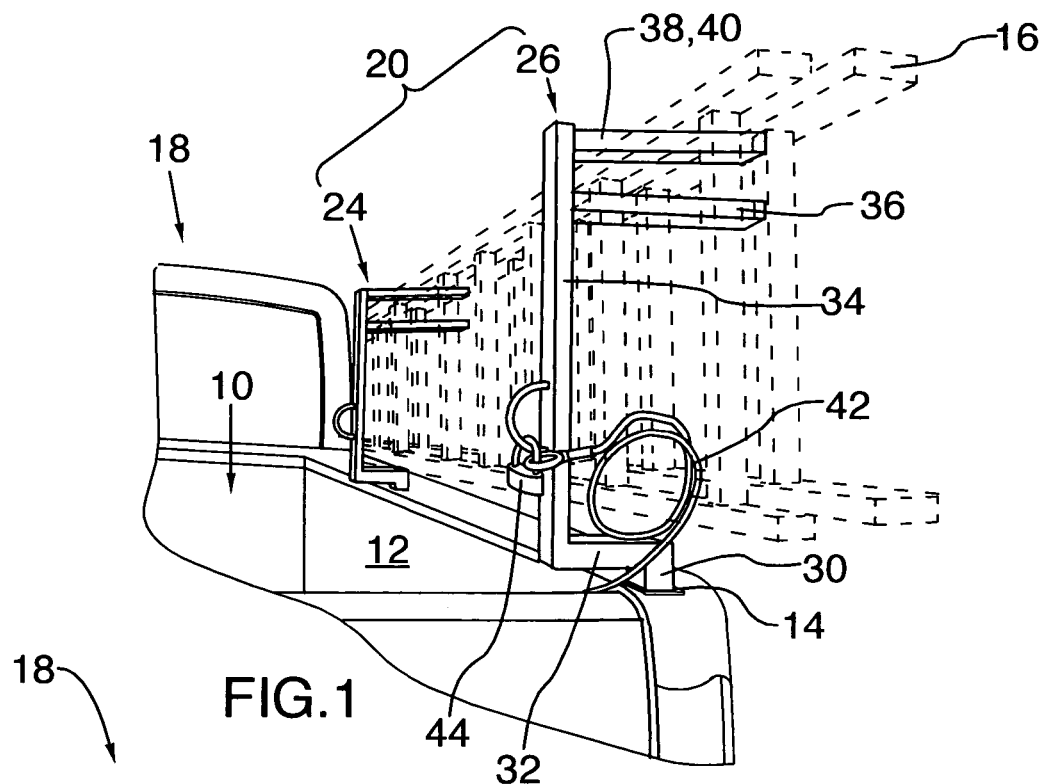
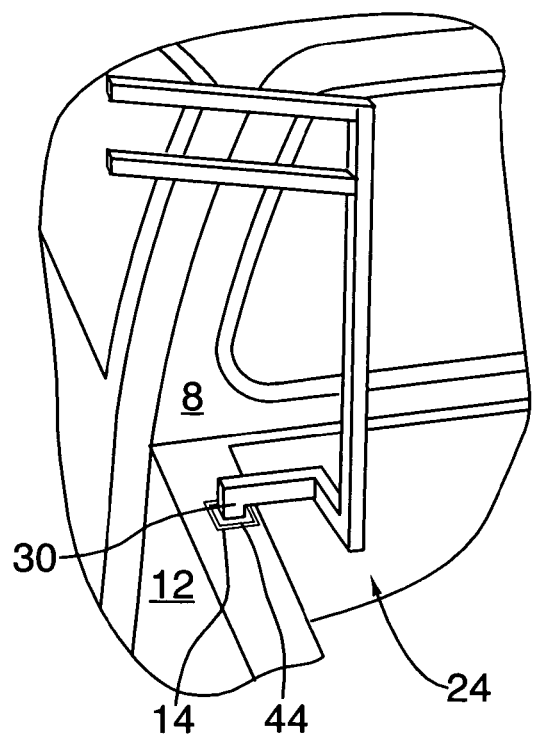
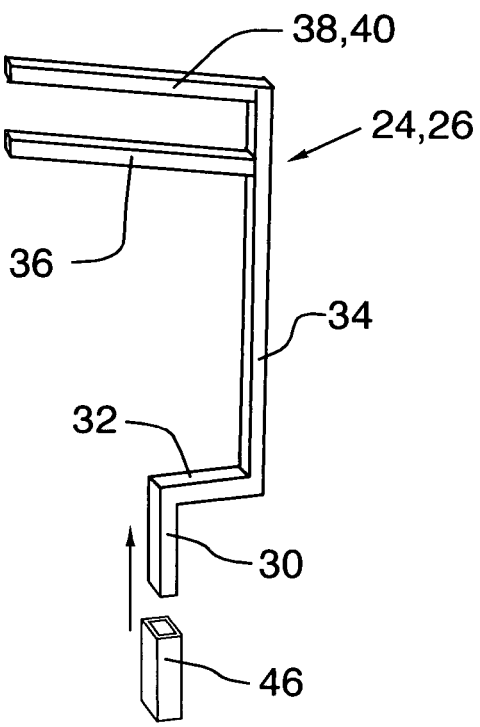
FIG.1
FIG.3
FIG.2

US 7,210,721 B1

SIDE MOUNTED LADDER RACK FOR PICK-UP TRUCK

FIELD OF THE INVENTION

This invention relates to more conveniently carrying ladders on a pick-up truck. More particularly this invention relates to ladder racks which mount into the holes in the bed walls of a pick-up truck. A ladder rack for a passenger side of a pick-up truck is provided. An offset ladder rack to carry an additional ladder on a driver's side of a pick-up truck, similar to the ladder rack on the passenger's side, but offset to position a ladder thereon above the box and behind the cab of the truck is also provided.

BACKGROUND OF THE INVENTION

It is frequently necessary to carry a ladder on a pick-up truck. Currently ladders must be carried inside the vehicle truck box, or alternatively on cumbersome racks which generally restrict the use of the truck box. It is generally necessary to climb into the truck box, carrying a ladder, to mount or remove the ladder from existing styles of ladder racks. It similarly is necessary to climb up and carry the ladder down from the truck box. A more convenient ladder rack is needed. A ladder rack which does not require the user to climb into the truck box in order to place, secure, or remove the ladder therefrom would be considerably more convenient.

Additionally, a ladder rack which does not interfere with use of the interior space of a truck box is advantageous most of the time when the truck is used. Most frequently when a ladder is used it is necessary to haul additional tools and equipment for work in conjunction with the ladder. It also would be desirable to have a ladder rack which is easily mounted, or removed from a truck so that it is convenient to remove the ladder rack when it is not needed. And finally it would be desirable to have a ladder rack which can be compactly stored behind the seat when not in use.

OBJECTS OF THE INVENTION

It is an object of this invention to disclose a ladder rack for a pick-up truck on which a ladder may be positioned and secured without having to climb up into the truck box while carrying the ladder. It is an object of this invention to disclose a ladder rack for a truck which does not interfere with use of the interior space of the truck box. It is yet a further object of this invention to disclose a ladder rack which when not in use is sufficiently compact so that it may be stored behind the truck seat, and which may be conveniently mounted on, or removed from use on a pick-up truck without having to climb into the truck box. Many individuals need a ladder only on an occasional basis. It is a final object of this invention to disclose a ladder rack having a security cord to prevent removal of a ladder from the ladder rack.

One aspect of this invention provides for a ladder rack to carry a ladder on a pick-up truck having a front and rear rack mounting openings in a top portion of the side wall of the bed box, comprising: a front and a rear ladder support each having, i) an upright insertion portion sized to be closely received within one of the mounting openings in the pick-up truck; ii) a lateral offset portion carried by, and extending inwardly from a top portion of the upright insertion portion; iii) a mast portion carried by an inner end portion of the lateral offset portion; iv) a lateral ladder carrying portion extending outwardly and upwardly from an upper portion of the mast, so that a ladder resting thereon will slide inwardly thereon to and against the mast; and, v) a ladder retention means extending outwardly over the ladder from a top portion of the mast to prevent the ladder from bouncing off the lateral ladder carrying portion. In use after the front and rear brackets are inserted within the rack openings, opposite ends of the ladder may be slid over the lateral ladder carrying portions of the supports thereby supporting the ladder parallel to and above the side wall of the bed box.

Various other objects, advantages and features of this invention will become apparent to those skilled in the art from the following description in conjunction with the accompanying drawings.

FIGURES OF THE INVENTION

FIG. 1 is a perspective view of a pick-up truck having a passenger side mounted ladder rack carrying a ladder. The ladder rack comprises similar front and rear supports.

FIG. 2 is a perspective view of a ladder support having a rubber sleeve around the upright insertion portion thereof. The rubber sleeve is used to adapt a support sized to fit a smaller side wall rack opening within a standard relatively larger rack opening so that a similarly sized support can be used on pick-up trucks having either a smaller or larger standard sized rack openings. The same supports can be used on either or both the passenger and driver side of the pick-up truck.

FIG. 3 is an enlarged perspective view of a pick-up truck having a front bed wall opening which is closer to its cab than the truck shown in FIG. 1. A front ladder support positioned therein further comprises a rear offset portion to position a ladder carried thereon back from the cab. The rear driver side rear support is similar to the rear bracket shown in FIG. 1.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Turning now to the drawings and more particularly to FIG. 1 we have a perspective view of a pick-up truck 18 having a passenger side mounted ladder rack 20 carrying a ladder 16. The ladder rack 20 comprises similar front 24 and rear 26 supports. Most generally, a ladder rack 20 to carry a ladder 16 on a pick-up truck 18 having a front and rear rack mounting openings 14 in a top portion of the side wall 12 of the bed box 10, comprises: a front 24 and a rear ladder support 26 each having, i) an upright insertion portion 30 sized to be closely received within one of the mounting openings 14 in the pick-up truck 18; ii) a lateral offset portion 32 carried by, and extending inwardly from a top portion of the upright insertion portion 30; iii) a mast portion 34 carried by an inner end portion of the lateral offset portion 32; iv) a lateral ladder carrying portion 36 extending outwardly and upwardly from an upper portion of the mast 34, so that a ladder 16 resting thereon will slide inwardly thereon to and against the mast 34; and, v) a ladder retention means 36 extending outwardly over the ladder 16 from a top portion of the mast 34 to prevent the ladder 16 from bouncing off the lateral ladder carrying portion 36. Wherein use after the front 24 and rear brackets 26 are inserted within the rack openings 14, opposite ends of the ladder 16 may be slid over the lateral ladder carrying portions 36 of the supports 24,26 thereby supporting the ladder 16 parallel to and above the side wall 12 of the bed box 10.

In the most preferred embodiment of the invention, the ladder carrying portion 36 of the supports 24.26 has sufficient length to carry two ladders 16 thereon. The ladder retention means is specifically intended to include a chain or a cable terminated in a pin. (neither shown) However in the most preferred embodiment of the invention the ladder retention means 38 comprises a top lateral member 40 extending outwardly from the mast 34 above and parallel to the ladder carrying portion 36 of the support 24,26. A top lateral member 40 is both effective and convenient in as much as the ladder 16 may be conveniently slid on or off the rack 20 thereby inherently retaining the ladder 16 thereon when bounced by the moving pick-up truck 18.

FIG. 1 also shows the use of a loss prevention cable 42. Most preferably the ladder rack 20 further comprises a ladder loss prevention cable 42. One end portion of the cable 42 is attached to one of the side wall 12 of the bed box 10 and the ladder support 24,26, and the other end portion thereof is adapted to removably and lockingly 44 attach to the other of the side wall 12 of the bed box 10 and the ladder support 24,26, thereby securing the ladder 1'6 when the cable 42 is lockably 44 attached and a central portion thereof is wrapped around the ladder 16 carried by the support 24,26.

FIG. 2 is a perspective view of a ladder support 24,26 having a rubber sleeve 46 around the upright insertion portion 30 thereof. The rubber sleeve 46 is used to adapt a support 24,26 sized to fit a smaller side wall rack opening 14 within a standard relatively larger rack opening 14 so that a similarly sized support 24,26 can be used on pick-up trucks 18 having either a smaller or larger standard sized rack openings 14. It is noted that Ford™, Dodge™, and older Chevrolet™ trucks all have larger openings 14. Newer ½ ton Chevrolet™ trucks and lighter load trucks all have smaller rack openings 14. The same supports 24,26 can be used on either or both the passenger and driver side of the pick-up truck 18. In a preferred embodiment of the invention the upright insertion portions 30 of the supports 24,26 are adapted to be received in both larger and smaller sized side wall rack openings 14. The upright insertion portion 30 of the supports 24,26 is sized to be closely received within the smaller of the openings 14. The supports 24,26 further comprise: a plastic sleeve 44 having interior dimensions to fit closely around the upright insertion portion 30 of the supports 24,26, and have exterior dimensions so that the sleeve 44 covered upright insertion portion 30 is closely received within the larger opening 14. Then the supports 24,26 can fit within the smaller openings 14 without the plastic sleeve 44, and within the larger openings 14 with the use of the plastic sleeve 44. Within this specification, "plastic" is defined to specifically include rubber.

FIG. 3 is an enlarged perspective view of a pick-up truck 18 having a front bed wall opening 14 which is closer to its cab 8 than the truck 18 shown in FIG. 1. A front ladder support 24 positioned therein further comprises a rear lateral offset portion 33 to position a ladder 16 carried thereon back from the cab 8. The rear driver side rear support 26 for use therewith (not shown in FIG. 3) is similar to the rear bracket 26 shown in FIG. 1. In a preferred embodiment of the invention the ladder rack 20, adapted for use in a pick-up truck 18 having a front rack opening 14 which is relatively closer to a front end of the side wall 12 of the bed box 10 further comprises: a rear lateral offset portion 33 extending between and separating the inner end portion of the lateral offset portion 32 and a lower end portion of the mast portion 34 of the front ladder support 24. Then when the ladder 16 is positioned over the ladder carrying positions 36 of the mounted supports 24,26 the ladder 16 is thereby shifted rearwardly along the side wall 12 of the bed box 10 thereby overcoming the difficulty of the rack opening 14 which is relatively close to the cab 8 end of the side wall 12 of the bed box 10.

Claims 7–10 specifically limit the ladder rack 20, adapted for use in a pick-up truck 18 having a front rack opening 14 which is relatively closer to a front end of the side wall 12, as described in the paragraph immediately above, similarly to the limitations limiting the general ladder rack 20 described initially under this DESCRIPTION OF THE INVENTION.

While the invention has been described with preferred specific embodiments thereof, it will be understood that this description is intended to illustrate and not to limit the scope of the invention, which is defined by the following claims.

I claim:

1. A ladder rack to carry a ladder on a pick-up truck having a front and rear rack mounting openings in a top portion of the side wall of the bed box, comprising:
   a front and a rear ladder support each having,
   i) an upright insertion portion sized to be closely received within one of the mounting openings in the pick-up truck;
   ii) a lateral offset portion carried by, and extending inwardly from a top portion of the upright insertion portion;
   iii) a mast portion carried by an inner end portion of the lateral offset portion;
   iv) a lateral ladder carrying portion extending outwardly and upwardly from an upper portion of the mast, so that a ladder resting thereon will slide inwardly thereon to and against the mast; and,
   v) a ladder retention means extending outwardly over the ladder from a top portion of the mast to prevent the ladder from bouncing off the lateral ladder carrying portion;
   wherein use after the front and rear brackets are inserted within the rack openings, opposite ends of the ladder may be slid over the lateral ladder carrying portions of the supports thereby supporting the ladder parallel to and above the side wall of the bed box.

2. A ladder rack as in claim 1 wherein the ladder carrying portion of the supports has sufficient length to carry two ladders thereon.

3. A ladder rack as in claim 2 wherein the ladder retention means comprises a top lateral member extending outwardly from the mast above and parallel to the ladder carrying portion of the support.

4. A ladder rack as in claim 3 wherein the upright insertion portions of the supports is adapted to be received in both larger and smaller sized side wall rack openings, and wherein the upright insertion portion of the supports is sized to be closely received within the smaller of the openings, further comprising:
   a plastic sleeve having interior dimensions to fit closely around the upright insertion portion of the supports, and having exterior dimensions so that the sleeve covered upright insertion portion is closely received within the larger opening;
   so that the supports can fit within the smaller openings without the plastic sleeve, and within the larger openings with the use of the plastic sleeve.

5. A ladder rack as in claim 4 further comprising a ladder loss prevention cable, one end portion thereof being attached to one of the side wall of the bed box and the ladder support, and the other end portion thereof adapted to removably and lockingly attach to the other of the side wall of the bed box and the ladder support, thereby securing the ladder carried by the support when the cable is lockably attached and a central portion thereof is wrapped around the ladder carried by the support.

6. A ladder rack as in claim 1, adapted for use in a pick-up truck having a front rack opening which is relatively closer to a front end of the sidewall of the bed box further comprising:

a rear lateral offset portion extending between and separating the inner end portion of the lateral offset portion and a lower end portion of the mast portion of the front ladder support;

so that when the ladder is positioned over the ladder carrying positions of the mounted supports the ladder is shifted rearwardly along the side wall of the bed box thereby overcoming the difficulty of the rack opening which is relatively close to the cab end of the side wall of the bed box.

7. A ladder rack as in claim 6 wherein the ladder carrying portion of the supports has sufficient length to carry two ladders thereon.

8. A ladder rack as in claim 7 wherein ladder retention means comprises a top lateral member extending outwardly from the mast above and parallel to the ladder carrying portion of the support.

9. A ladder rack as in claim 8 wherein the upright insertion portions of the supports is adapted to be received in both larger and smaller sized side wall rack openings, and wherein the upright insertion portion of the supports is sized to be closely received within the smaller of the openings, further comprising:

a plastic sleeve having interior dimensions to fit closely around the upright insertion portion of the supports, and having exterior dimensions so that the sleeve covered upright insertion portion is closely received within the larger opening;

so that the supports can fit within the smaller openings without the plastic sleeve, and within the larger openings with the use of the plastic sleeve.

10. A ladder rack as in claim 9 further comprising a ladder loss prevention cable, one end portion thereof being attached to one of the side wall of the bed box and the ladder support, and the other end portion thereof adapted to removably and lockingly attach to the other of the side wall of the bed box and the ladder support, thereby securing the ladder carried by the support when the cable is lockably attached and a central portion thereof is wrapped around the ladder carried by the support.

\* \* \* \* \*